US012613402B2

(12) United States Patent
    Teranishi

(10) Patent No.: US 12,613,402 B2
(45) Date of Patent: Apr. 28, 2026

(54) MICROSCOPE OBJECTIVE LENS

(71) Applicant: AAC OPTICS (CHANGZHOU) CO., LTD., Changzhou (CN)

(72) Inventor: Takaaki Teranishi, Osaka (JP)

(73) Assignee: AAC OPTICS (CHANGZHOU) CO., LTD., Changzhou (CN)

( * ) Notice: Subject to any disclaimer, the term of this patent is extended or adjusted under 35 U.S.C. 154(b) by 285 days.

(21) Appl. No.: 18/391,577

(22) Filed: Dec. 20, 2023

(65) Prior Publication Data

US 2025/0044568 A1      Feb. 6, 2025

(51) Int. Cl.
    *G02B 21/02*      (2006.01)
    *G02B 9/62*       (2006.01)
(52) U.S. Cl.
    CPC ................ *G02B 21/02* (2013.01); *G02B 9/62* (2013.01)
(58) Field of Classification Search
    CPC .................................... G02B 9/06; G02B 9/64
    See application file for complete search history.

(56) References Cited

U.S. PATENT DOCUMENTS

| | | | | |
|---|---|---|---|---|
| 11,262,534 | B2 * | 3/2022 | Yamazaki | .......... G02B 13/0045 |
| 2014/0049843 | A1 * | 2/2014 | Kubota | ................... G02B 9/62 |
| | | | | 359/757 |
| 2016/0062081 | A1 * | 3/2016 | Kubota | .............. G02B 13/0045 |
| | | | | 359/757 |

FOREIGN PATENT DOCUMENTS

CN        217181330 U  *  8/2022

OTHER PUBLICATIONS

English Language Translation of CN-217181330-U.*

* cited by examiner

*Primary Examiner* — Thomas K Pham
*Assistant Examiner* — Ruby L Kauffman
(74) *Attorney, Agent, or Firm* — Wiersch Law Group

(57)            ABSTRACT

The present application relates to the field of optical lenses, and in particular, relates to a microscope objective lens suitable for use in a device such as a microscope. The microscope objective lens includes in order from an emitting side to an objective side: a first lens having a positive refractive force, a second lens having a negative refractive force, a third lens having a positive refractive force, a fourth lens having a positive refractive force, a fifth lens having a negative refractive force, and a sixth lens having a positive refractive force. The following relationship expressions are satisfied: $-5.00 \leq R11/R12 \leq -1.50$; $0.40 \leq WD/TTL \leq 0.60$; $1.00 \leq R1/((n1-1)*f) \leq 4.00$; $2.00 \leq d5/d4 \leq 6.00$. The microscope objective lens of the present application lens has excellent optical performance, low distortion, and a long working distance, which is particularly suitable for optical microscope.

10 Claims, 6 Drawing Sheets

10

ST  L1  L2  L3    L4  L5  L6

Objective Surface

MICROSCOPE OBJECTIVE LENS

TECHNICAL FIELD

The present application relates to the technical field of optical lenses, in particular to a microscope objective lens applicable in a device such as a microscope.

BACKGROUND

In recent years, there has been a growing demand for microscope lenses. However, conventional microscope lenses often exhibit distortions within their microscopic range due to optical structural constraints. Additionally, the length of microscope lenses is inevitably affected by the presence of multiple lenses, and elongated structures may result in a shorter working distance. The magnification is also influenced by the working distance, which may be inconvenient for operators.

With the advancement of technology and the increasing diversity of user demands, there is a growing need in scientific research for microscope lenses with improved observation quality. There is an urgent demand for microscope lenses that exhibit excellent optical characteristics, low distortion, high magnifications, and a long working distance.

SUMMARY

The technical problem to be solved by the present application is to provide a microscope objective lens that achieves high imaging performance while satisfying the requirements of low distortion and a long working distance.

In order to solve the above technical problem, the present application provides a microscope objective lens, comprising in order from an emitting side to an objective side:

a first lens having a positive refractive force;
a second lens having a negative refractive force;
a third lens having a positive refractive force;
a fourth lens having a positive refractive force;
a fifth lens having a negative refractive force; and
a sixth lens having a positive refractive force;

wherein a central radius of curvature of an emitting surface of the sixth lens is R11; a central radius of curvature of an objective surface of the sixth lens is R12; an on-axis distance from the objective surface of the microscope objective lens to an objective surface of the sixth lens is WD; an on-axis distance from the objective surface of the microscope objective lens to an emitting surface of the first lens is TTL; a central radius of curvature of the emitting surface of the first lens is R1; a refractive index of the first lens is n1; a focal length of the microscope objective lens is f; an on-axis thickness of the third lens is d5; an on-axis distance from the second lens to the third lens is d4, and the following relationship expressions are satisfied: $-5.00 \le R11/R12 \le -1.50$; $0.40 \le WD/TTL \le 0.60$; $1.00 \le R1/((n1-1)*f) \le 4.00$; $2.00 \le d5/d4 \le 6.00$.

In one embodiment, a focal length of the fifth lens is f5, and the following relationship expression is satisfied: $-0.30 \le f5/f \le -0.20$.

In one embodiment, a central radius of curvature of an emitting surface of the fourth lens is R7, and the following relationship expression is satisfied: $0.70 \le R7/f \le 2.10$.

In one embodiment, the emitting surface of the first lens is convex at a proximal-axis position, and the objective surface of the first lens is convex at the proximal-axis position;

a central radius of curvature of the emitting surface of the first lens is R1, a central radius of curvature of the objective surface of the first lens is R2, an on-axis thickness of the first lens is d1, and a focal length of the first lens is f1, and the following relationship expressions are satisfied: $0.35 \le f1/f \le 1.08$; $-0.71 \le (R1+R2)/(R1-R2) \le 0.97$; $0.02 \le d1/TTL \le 0.11$.

In one embodiment, an emitting surface of the second lens is concave at the proximal-axis position, and an objective surface of the second lens is concave at the proximal-axis position; a central radius of curvature of the emitting surface of the second lens is R3; a central radius of curvature of the objective surface of the second lens is R4; a focal length of the second lens is f2; an on-axis thickness of the second lens is d3, and the following relationship expressions are satisfied: $-0.75 \le f2/f \le -0.22$; $-0.56 \le (R3+R4)/(R3-R4) \le 0$; $0.01 \le d3/TTL \le 0.07$.

In one embodiment, an objective side of the third lens is convex at the proximal-axis position; a central radius of curvature of an emitting surface of the third lens is R5; a central radius of curvature of the objective surface of the third lens is R6; a focal length of the third lens is f3, and the following relationship expressions are satisfied: $0.26 \le f3/f \le 0.94$; $0.43 \le (R5+R6)/(R5-R6) \le 1.52$; $0.04 \le d5/TTL \le 0.17$.

In one embodiment, an emitting surface of the fourth lens is convex at the proximal-axis position, and an objective surface of the fourth lens is convex at the proximal-axis position; a focal length of the fourth lens is f4; a central radius of curvature of the emitting surface of the fourth lens is R7; a central radius of curvature of the objective surface of the fourth lens is R8; an on-axis thickness of the fourth lens is d7, and the following relationship expressions are satisfied: $0.36 \le f4/f \le 1.30$; $0 \le (R7+R8)/(R7-R8) \le 0.86$; $0.02 \le d7/TTL \le 0.12$.

In one embodiment, an emitting surface of the fifth lens is concave at the proximal-axis position, and an objective surface of the fifth lens is concave at the proximal-axis position; a central radius of curvature of the emitting surface of the fifth lens is R9; a central radius of curvature of the objective surface of the fifth lens is R10; an on-axis thickness of the fifth lens is d9, and the following relationship expressions are satisfied: $-1.34 \le (R9+R10)/(R9-R10) \le 0.03$; $0.01 \le d9/TTL \le 0.15$.

In one embodiment, the emitting surface of the sixth lens is convex at the proximal-axis position, and the objective surface of the sixth lens is convex at the proximal-axis position; a focal length of the sixth lens is f6; an on-axis thickness of the sixth lens is d11, and the following relationship expressions are satisfied: $0.23 \le f6/f \le 0.81$; $0.03 \le d11/TTL \le 0.18$.

In one embodiment, the first lens, the second lens, the third lens, the fourth lens, the fifth lens, and the sixth lens are all made of glass.

The beneficial effects of the present application are as follows: the microscope objective lens of the present application exhibits excellent optical performance, with low distortion, a magnification of 4.7-5 times, and a long working distance, which is particularly suitable for optical microscope objective lenses.

DETAILED DESCRIPTION OF THE EMBODIMENTS

The technical solutions in the embodiments of the present application will be described clearly and completely in the following. Obviously, the described embodiments are only a part of the embodiments of the present application and not all of the embodiments. Based on the embodiments in the present application, all other embodiments obtained by those of ordinary skill in the art without making creative labor are within the protection scope of the present application.

First Embodiment

Figure 1:
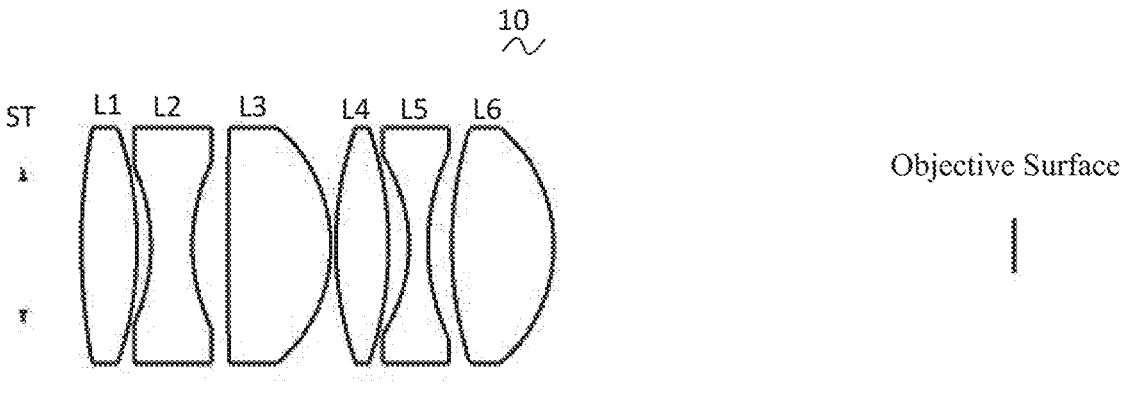
FIG. 1 is a structural diagram of a microscope objective lens according to the first embodiment of the present application.

As shown in the accompanying drawings, the present application provides a microscope objective lens. FIG. 1 shows a microscope objective lens 10 according to the first embodiment of the present application, and the microscope objective lens 10 includes six lenses. Specifically, the microscope objective lens 10, includes in order from an emitting side to an objective side: an aperture ST, a first lens L1, a second lens L2, a third lens L3, a fourth lens L4, a fifth lens L5, a sixth lens L6, and an objective surface.

It is defined that a central radius of curvature of the emitting surface of the sixth lens L6 is R11, and a central radius of curvature of the objective surface of the sixth lens L6 is R12. The following relationship expression is satisfied. $-5.00 \le R11/R12 \le -1.50$. The shape of the sixth lens L6 is specified within the above range, which facilitates a smooth transition of the exit light and contributes to the enhancement of the image quality.

It is defined that an on-axis distance from the objective surface of the microscope objective lens 10 to the objective surface of the sixth lens L6 is WD, i.e., the working distance is WD, and an on-axis distance from the objective surface of the microscope objective lens to the emitting surface of the first lens is TTL, i.e., the total optical length is TTL. The following relationship expression is satisfied: $0.40 \le WD/TTL \le 0.60$. The working distance WD is the object of the observed object to the objective surface closest to the object, and TTL is the distance from the object to the farthest objective lens. If it is lower than the lower limit of the above relationship expression, the distance between the microscope objective lens and the object is too narrow, and the operation of this microscope objective lens is poor. On the contrary, if it is higher than the upper limit value of the above relationship expression, the space for the lens portion to occupy is insufficient. Therefore, the thickness of the lens that can be configured is limited, and it is difficult to correct the spherical distortion and the chromatic distortion.

It is defined that a central radius of curvature of the emitting surface of the first lens L1 is R1, a refractive index of the first lens L1 is n1, and a focal length of the microscope objective lens 10 is f. The following relationship expression is satisfied: $1.00 \le R1/((n1-1)*f) \le 4.00$. Within this range, the relationship among the shape of the first lens, the refractive index of the material, and the focal length of the microscope objective lens is reasonably controlled, which is conducive to controlling the light trend, making the emitted light smooth.

It is defined that an on-axis thickness of the third lens L3 is d5, and an on-axis distance from the second lens L2 to the third lens L3 is d4. The following relationship expression is satisfied: $2.00 \le d5/d4 \le 6.00$. The ratio between the thickness of the third lens L3 and the air spacing between the second lens L2 and the third lens L3 is specified, which facilitates the assembly of the lens within the range of the above equation.

When the focal length, the focal length of each lens, the total optical length of the microscope objective lens, the working distance, the on-axis thickness, the numerical aperture, the Abbe number of each lens, and the radius of curvature of the center of the microscope objective lens 10 in the present application satisfy the above relationship expressions, it is possible for the microscope objective lens 10 to satisfy the design requirements of low distortion, 4.7-5 times magnification, and long working distance.

It is defined that a focal length of the fifth lens is f5, and the following relationship expression is satisfied: $-0.30 \le f5/f \le -0.20$. The ratio of the focal length of the fifth lens L5 to the focal length of the microscope objective lens 10 is stipulated within the range of the relationship expression. By reasonably distributing the optical focal length of the system, it is conducive to correcting the dispersion and distortion of the microscope objective lens, so that the distortion $|Distortion| \le 0.25\%$, and it is possible to effectively reduce the generation of dark corners.

It is defined that a central radius of curvature of the emitting surface of the fourth lens L4 is R7, and the following relationship is satisfied: $0.70 \le R7/f \le 2.10$. The shape of an image surface of the fourth lens L4 is specified within the range of the relationship expression, which contributes to a smooth transition of the light ray, and in which the chromatic distortion of the microscopic objective lens can be efficiently corrected to $|LC| \le 0.6$ μm.

In this embodiment, the emitting surface of the first lens L1 is convex at the proximal-axis position, and the objective surface of the first lens L1 is convex at the proximal-axis position. The first lens L1 has a positive refractive force. In other embodiments, the emitting surface and the objective surface of the first lens L1 may also be set to other concave and convex distributions.

It is defined that the focal length of the first lens L1 is f1, and the following relationship expression is satisfied: $0.35 \le f1/f \le 1.08$. The positive refractive force of the first lens L1 is specified within this range, which contributes to controlling the total optical length of the microscope objective lens. In an embodiment, $0.56 \leq f1/f \leq 0.87$.

It is defined that the central radius of curvature of the emitting surface of the first lens L1 is R1, and the central radius of curvature of the objective side of the first lens L1 is R2. The following relationship expression is satisfied: $-0.71 \leq (R1+R2)/(R1-R2) \leq 0.97$. The shape of the first lens is reasonably controlled, so that the first lens is able to correct the systematic spherical distortion effectively. In an embodiment, $-0.44 \leq (R1+R2)/(R1-R2) \leq 0.78$.

It is defined that the on-axis thickness of the first lens L1 is d1, and the following relationship expression is satisfied: $0.02 \leq d1/TTL \leq 0.11$, thereby facilitating the control of the total optical length of the microscope objective lens. In an embodiment, $0.04 \leq d1/TTL \leq 0.09$.

In this embodiment, an emitting surface of the second lens L2 is concave at the proximal-axis position, and an objective surface of the second lens L2 is concave at the proximal-axis position. The second lens L2 has a negative refractive force. In other embodiments, the emitting surface and the objective surface of the second lens L2 may also be set to other concave and convex distributions.

It is defined that a focal length of the second lens L2 is f2, and the following relationship expression is satisfied: $-0.75 \leq f2/f \leq -0.22$. The negative optical focus of the second lens L2 is controlled in a reasonable range, which facilitates correcting the distortion of the optical system. In an embodiment, $-0.47 \leq f2/f \leq -0.28$.

It is defined that a central radius of curvature of the emitting surface of the second lens L2 is R3, and a central radius of curvature of the objective side of the second lens L2 is R4. The following relationship expression is satisfied: $-0.56 \leq (R3+R4)/(R3-R4) \leq 0$. The shape of the second lens L2 is specified within the above range, which is conducive to correcting the problem of on-axis chromatic distortion. In an embodiment, $-0.35 \leq (R3+R4)/(R3-R4) \leq 0$.

An on-axis thickness of the second lens L2 is d3, and the following relationship expression is satisfied: $0.01 \leq d3/TTL \leq 0.07$, which is conducive to controlling the total optical length of the microscope objective lens. In an embodiment, $0.02 \leq d3/TTL \leq 0.05$.

In this embodiment, the emitting surface of the third lens L3 is convex at the proximal-axis position, and the objective surface of the third lens L3 is convex at the proximal-axis position. The third lens L3 has a positive refractive force. In other embodiments, the emitting surface and the objective surface of the third lens L3 may also be set to other concave and convex distributions.

It is defined that the focal length of the third lens L3 is f3, and the following relationship expression is satisfied: $0.26 \leq f3/f \leq 0.94$. The positive optical focus of the third lens L3 is controlled in a reasonable range, which is conducive to correcting the distortion of the optical system. In an embodiment, $0.41 \leq f3/f \leq 0.76$.

It is defined that the central radius of curvature of the emitting surface of the third lens L3 is R5, and a central radius of curvature of the objective surface of the third lens L3 is R6. The following relationship expression is satisfied: $0.43 \leq (R5+R6)/(R5-R6) \leq 1.52$.

Thus, the shape of the third lens L3 can be effectively controlled, which is conducive to molding the third lens L3, and avoids poor molding and the generation of stress due to the excessively large surface curvature of the third lens L3. In an embodiment, $0.69 \leq (R5+R6)/(R5-R6) \leq 1.22$.

It is defined that the on-axis thickness of the third lens L3 is d5, and the following relationship expression is satisfied: $0.04 \leq d5/TTL \leq 0.17$, which facilitates controlling the total optical length of the microscope objective lens. In an embodiment, $0.06 \leq d5/TTL \leq 0.13$.

In this embodiment, an emitting surface of the fourth lens L4 is convex at the proximal-axis position, and an objective surface of the fourth lens L4 is convex at the proximal-axis position. The fourth lens L4 has a positive refractive force. In other embodiments, the emitting surface and the objective surface of the fourth lens L4 may also be set to other concave and convex distributions.

It is defined that a focal length of the fourth lens L4 is f4, and the following relationship expression is satisfied: $0.36 \leq f4/f \leq 1.30$. The optical focal length is distributed reasonably, so that the system is made to have better imaging quality and lower sensitivity. In an embodiment, $0.58 \leq f4/f \leq 1.04$.

It is defined that a central radius of curvature of the emitting surface of the fourth lens L4 is R7, and a central radius of curvature of the objective side of the fourth lens L4 is R8. The following relationship expression is satisfied: $0 \leq (R7+R8)/(R7-R8) \leq 0.86$, so the shape of the fourth lens L4 is specified within the range, which is conducive to correcting the distortion of the image of the off-axis drawing angle. In an embodiment, $0 \leq (R7+R8)/(R7-R8) \leq 0.69$.

It is defined that an on-axis thickness of the fourth lens L4 is d7, and the following relationship expression is satisfied: $0.02 \leq d7/TTL \leq 0.12$. A ratio of the on-axis thickness of the fourth lens L4 to the total optical length TTL of the microscope objective lens 10 is specified, which is conducive to controlling the total optical length of the microscope objective lens. In an embodiment, $0.04 \leq d7/TTL \leq 0.10$.

In this embodiment, an emitting surface of the fifth lens L5 is concave at the proximal-axis position, and an objective surface of the fifth lens L5 is concave at the proximal-axis position. The fifth lens L5 has a negative refractive force. In other optional embodiments, the emitting surface and the objective surface of the fifth lens L5 may also be set to other concave and convex distributions.

It is defined that a central radius of curvature of the emitting surface of the fifth lens L5 is R9, and a central radius of curvature of the objective surface of the fifth lens L5 is R10. The following relationship expression is satisfied: $-1.34 \leq (R9+R10)/(R9-R10) \leq 0.03$, so that the shape of the fifth lens L5 is specified within the range of conditions, which is conducive to correcting the distortion of the image of the off-axis drawing angle. In an embodiment, $-0.84 \leq (R9+R10)/(R9-R10) \leq 0.02$.

It is defined that an on-axis thickness of the fifth lens L5 is d9, and the following relationship expression is satisfied: $0.01 \leq d9/TTL \leq 0.15$, which facilitates controlling the total optical length of the microscope objective lens. In an embodiment, $0.02 \leq d9/TTL \leq 0.12$.

In this embodiment, an emitting surface of the sixth lens L6 is convex at the proximal-axis position, and an objective surface of the sixth lens L6 is convex at the proximal-axis position. The sixth lens L6 has a positive refractive force. In other optional embodiments, the emitting surface and the objective surface of the sixth lens L6 may also be set to other concave and convex distributions.

It is defined that a focal length of the sixth lens L6 is f6, and the following relationship expression is satisfied: $0.23 \leq f6/f \leq 0.81$, so that the system is made to have better imaging quality and lower sensitivity by a reasonable distribution of optical focal length. In an embodiment, $0.37 \leq f6/f \leq 0.65$.

It is defined that an on-axis thickness of the sixth lens L6 is d11, and the following relationship expression is satisfied: $0.03 \leq d11/TTL \leq 0.18$. A ratio of the on-axis thickness of the sixth lens L6 to the total optical length TTL of the microscope objective lens 10 is specified, which is conducive to controlling the total optical length of the microscope objective lens. In an embodiment, 0.05≤d11/TTL≤0.15.

In this embodiment, the optical total length TTL of the microscope objective lens 10 is less than or equal to 95 mm.

In this embodiment, a field-of-view angle of the microscope objective lens 10 is greater than or equal to 6.40°.

In this embodiment, an image height of the microscope objective lens 10 is greater than or equal to 2.40 mm.

In this embodiment, the first lens, the second lens, the third lens, the fourth lens, the fifth lens, and the sixth lens are all made of glass.

The microscope objective lens 10 of the present application will be illustrated below by way of examples. The symbols recorded in each example are as follows. Focal length, on-axis distance, central radius of curvature, and on-axis thickness are in mm.

TTL: Total optical length (on-axis distance from the emitting surface of the first lens L1 to the objective surface) in mm;

Table 1 illustrates the design data of the microscope objective lens 10 according to the first embodiment of the present application.

TABLE 1

| Design data for microscope objective lens 10 | | | | | | | |
|---|---|---|---|---|---|---|---|
| | | R | d | | Nd | | Vd |
| ST | | INF | dST | 5.46 | | | |
| L1 | R1 | 51.810 | d1 | 5.200 | n1 | 1.6584 v1 | 50.852 |
| | R2 | −28.940 | d2 | 1.270 | | | |
| L2 | R3 | −15.580 | d3 | 3.900 | n2 | 1.5168 v2 | 64.199 |
| | R4 | 15.580 | d4 | 3.290 | | | |
| L3 | R5 | 397.440 | d5 | 9.600 | n3 | 1.4970 v3 | 81.605 |
| | R6 | −12.820 | d6 | 0.500 | | | |
| L4 | R7 | 29.440 | d7 | 4.870 | n4 | 1.4970 v4 | 81.605 |
| | R8 | −29.440 | d8 | 1.910 | | | |
| L5 | R9 | −13.370 | d9 | 1.800 | n5 | 1.7433 v5 | 49.222 |
| | R10 | 17.820 | d10 | 2.240 | | | |
| L6 | R11 | 32.350 | d11 | 9.480 | n6 | 1.4970 v6 | 81.605 |
| | R12 | −12.820 | d12 | 42.980 | | | |

The meaning of each symbol is as follows.

ST: aperture;

R: central radius of curvature at the center of the optical surface;

R1: central radius of curvature at the emitting surface of the first lens L1;

R2: central radius of curvature at the objective surface of the first lens L1;

R3: central radius of curvature at the emitting surface of the second lens L2;

R4: central radius of curvature of the objective surface of the second lens L2;

R5: central radius of curvature of the emitting surface of the third lens L3;

R6: central radius of curvature of the objective surface of the third lens L3;

R7: central radius of curvature of the emitting surface of the fourth lens L4;

R8: central radius of curvature of the objective surface of the fourth lens L4;

R9: central radius of curvature of the emitting surface of the fifth lens L5;

R10: central radius of curvature of the objective surface of the fifth lens L5;

R11: central radius of curvature of the emitting surface of the sixth lens L6;

R12: central radius of curvature of the objective surface of the sixth lens L6;

d: on-axis thickness of the lens, the on-axis distance between the lenses;

dST: on-axis distance from the aperture ST to the emitting surface of the first lens;

d1: on-axis thickness of the first lens L1;

d2: on-axis distance from the objective surface of the first lens L1 to the emitting surface of the second lens L2;

d3: on-axis thickness of the second lens L2;

d4: on-axis distance from the objective surface of the second lens L2 to the emitting surface of the third lens L3;

d5: on-axis thickness of the third lens L3;

d6: on-axis distance from the objective surface of the third lens L3 to the emitting surface of the fourth lens L4;

d7: on-axis thickness of the fourth lens L4;

d8: on-axis distance from the objective surface of the fourth lens L4 to the emitting surface of the fifth lens L5;

d9: on-axis thickness of the fifth lens L5;

d10: on-axis distance from the objective surface of the fifth lens L5 to the sixth lens L6;

d11: on-axis thickness of the sixth lens L6;

d12: on-axis distance from the objective surface of the sixth lens L6 to the objective surface;

Nd: refractive index of the d line;

n1: refractive index of the d line of the first lens L1;

n2: refractive index of the d line of the second lens L2;

n3: refractive index of the d line of the third lens L3;

n4: refractive index of the d line of the fourth lens L4;

n5: refractive index of the d line of the fifth lens L5;

n6: refractive index of the d line of the fifth lens L5;

vd: abbe number;

v1: Abbe number of the first lens L1;

v2: Abbe number of the second lens L2;

v3: Abbe number of the third lens L3;

v4: Abbe number of the fourth lens L4;

v5: Abbe number of the fifth lens L5;

v6: Abbe number of the sixth lens L6.

Figure 2:
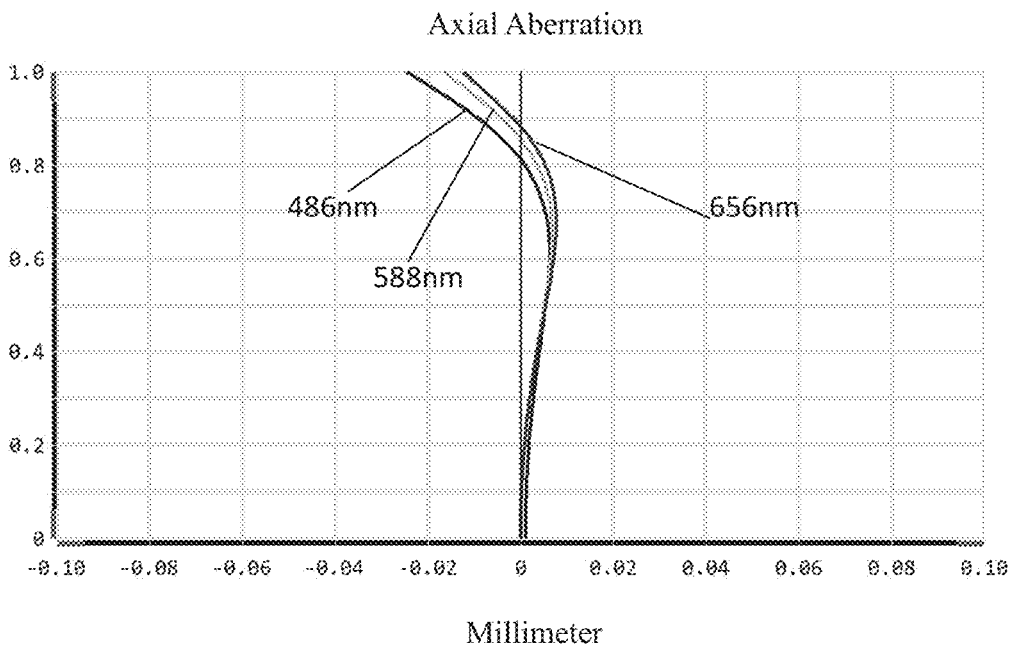
FIG. 2 is a schematic diagram showing the axial aberration of the microscope objective lens shown in FIG. 1.
Figure 3:
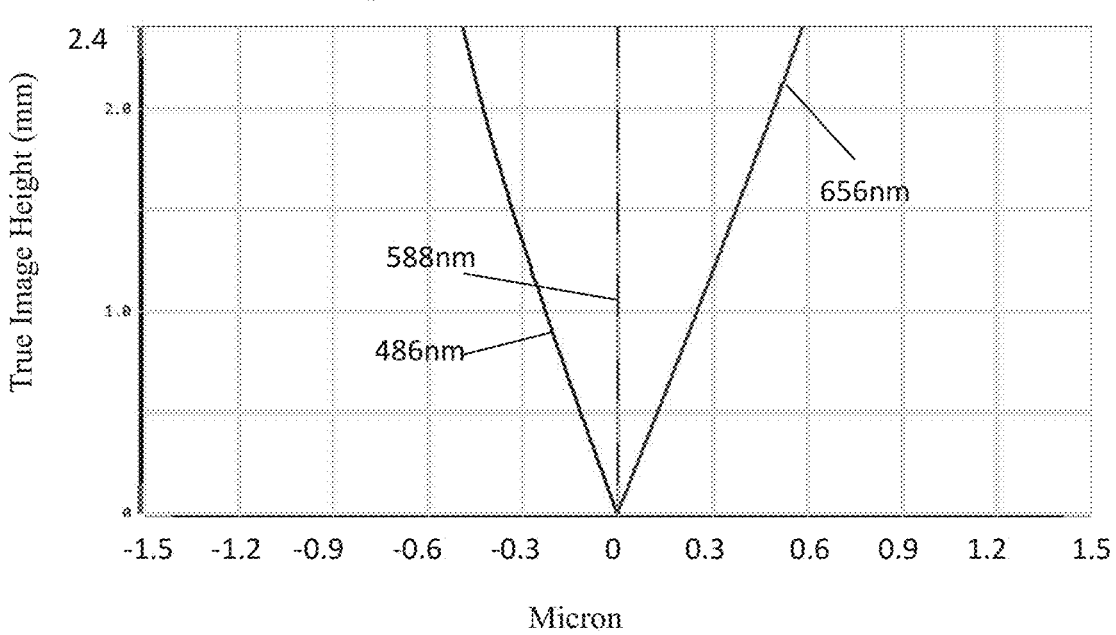
FIG. 3 is a schematic diagram showing the magnification chromatic aberration of the microscope objective lens shown in FIG. 1.
Figure 4:
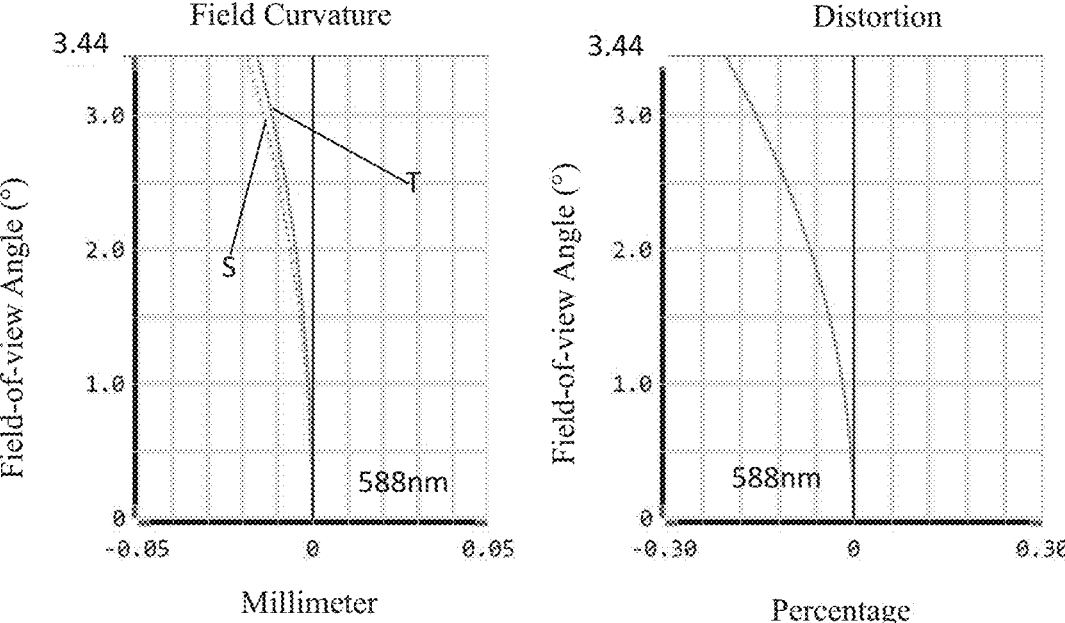
FIG. 4 is a schematic diagram of the field curvature and distortion of the microscope objective lens shown in FIG. 1.

FIGS. 2-3 are schematic diagrams showing the axial aberration and the magnification chromatic aberration of light with wavelengths of 486 nm, 588 nm, and 656 nm, respectively, after passing through the microscope objective lens 10 of the first embodiment. FIG. 4 shows a schematic diagram showing field curvature and distortion of light of wavelength 588 nm after passing through the microscope objective lens 10 of the first embodiment. The field curvature S of FIG. 4 is a field curvature in the arc-sagittal direction, and the field curvature T is a field curvature in the meridional direction.

Table 4 in the following shows the values corresponding to various values in the first, second, and third embodiments of each embodiment and the parameters that have been specified in the relationship expression.

As shown in Table 4, the first embodiment satisfies each of the relationship expressions.

In this embodiment, the microscope objective lens has an Entrance Pupil Diameter (ENPD) of 11.320 mm, a full field-of-view image height (IH) of 2.400 mm, a field-of-view (FOV) of 6.88° in the diagonal direction, a numerical aperture (NA) of 0.14 mm, a long working distance, and has excellent optical characteristics due to its on-axis and off-axis chromatic aberrations being sufficiently compensated.

Second Embodiment

Figure 5:
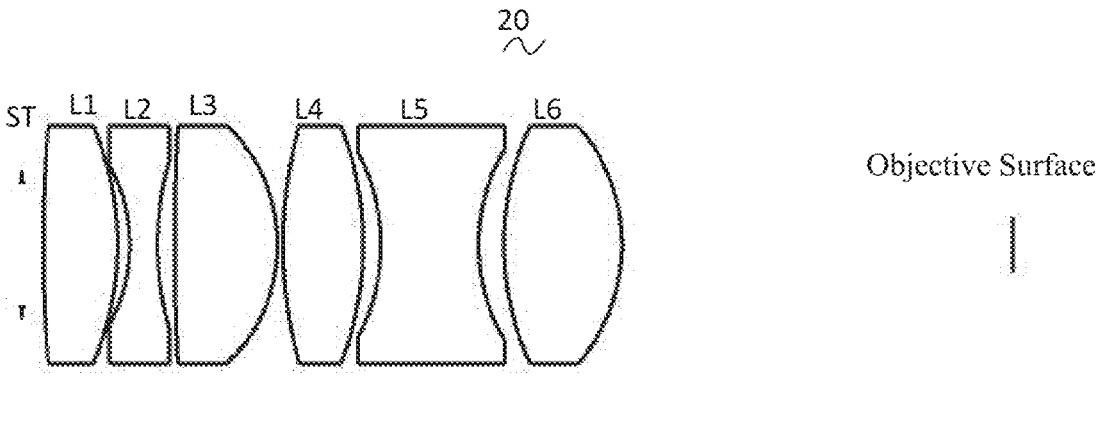
FIG. 5 is a structural diagram of the microscope objective lens according to the second embodiment of the present application.

The second embodiment is essentially the same as the first embodiment, and the meaning of the symbols is the same as that of the first embodiment, and the structural form of the microscope objective lens 20 of this second embodiment is shown in FIG. 5, and only the differences are listed hereinafter.

Table 2 shows the design data of the microscope objective lens 20 according to the second embodiment of the present application.

TABLE 2

| | | Design data of microscope objective lens 20 | | | | | |
|---|---|---|---|---|---|---|---|
| | | R | d | | Nd | | Vd |
| ST | | INF | dST | 1.942 | | | |
| L1 | R1 | 111.134 | d1 | 6.933 | n1 | 1.6584 v1 | 50.852 |
| | R2 | −23.684 | d2 | 1.130 | | | |
| L2 | R3 | −13.163 | d3 | 2.596 | n2 | 1.5168 v2 | 64.199 |
| | R4 | 23.478 | d4 | 1.600 | | | |
| L3 | R5 | 176.910 | d5 | 9.596 | n3 | 1.4970 v3 | 81.605 |
| | R6 | −13.264 | d6 | 0.500 | | | |
| L4 | R7 | 34.284 | d7 | 7.507 | n4 | 1.4970 v4 | 81.605 |
| | R8 | −25.308 | d8 | 1.642 | | | |
| L5 | R9 | −15.462 | d9 | 9.103 | n5 | 1.7433 v5 | 49.222 |
| | R10 | 14.871 | d10 | 2.362 | | | |
| L6 | R11 | 22.161 | d11 | 10.997 | n6 | 1.4970 v6 | 81.605 |
| | R12 | −14.687 | d12 | 36.497 | | | |

Figure 6:
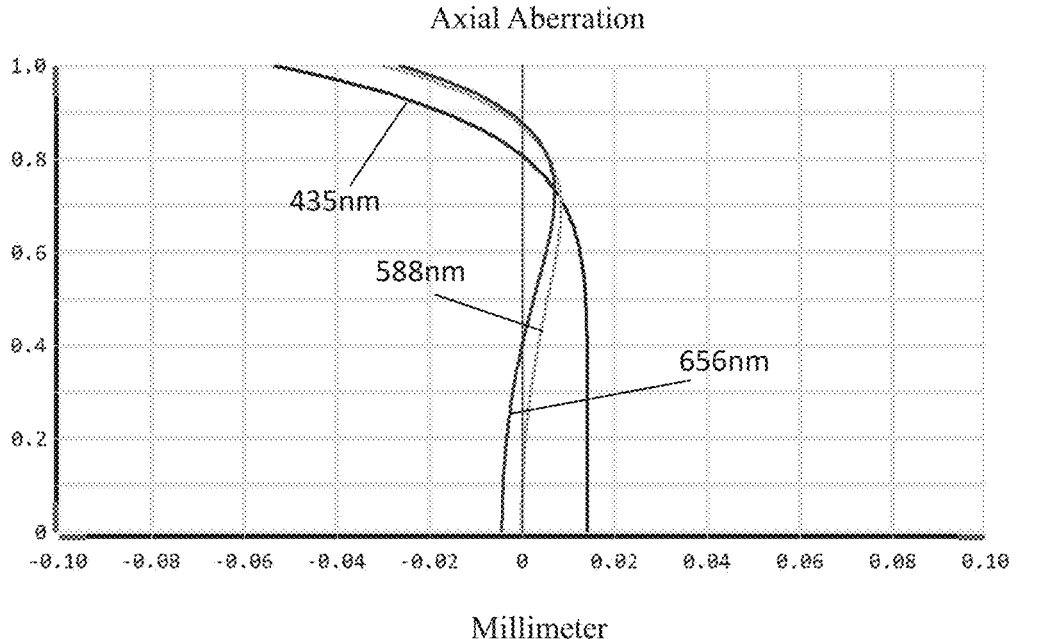
FIG. 6 is a schematic diagram showing the axial aberration of the microscope objective lens shown in FIG. 5.
Figure 7:
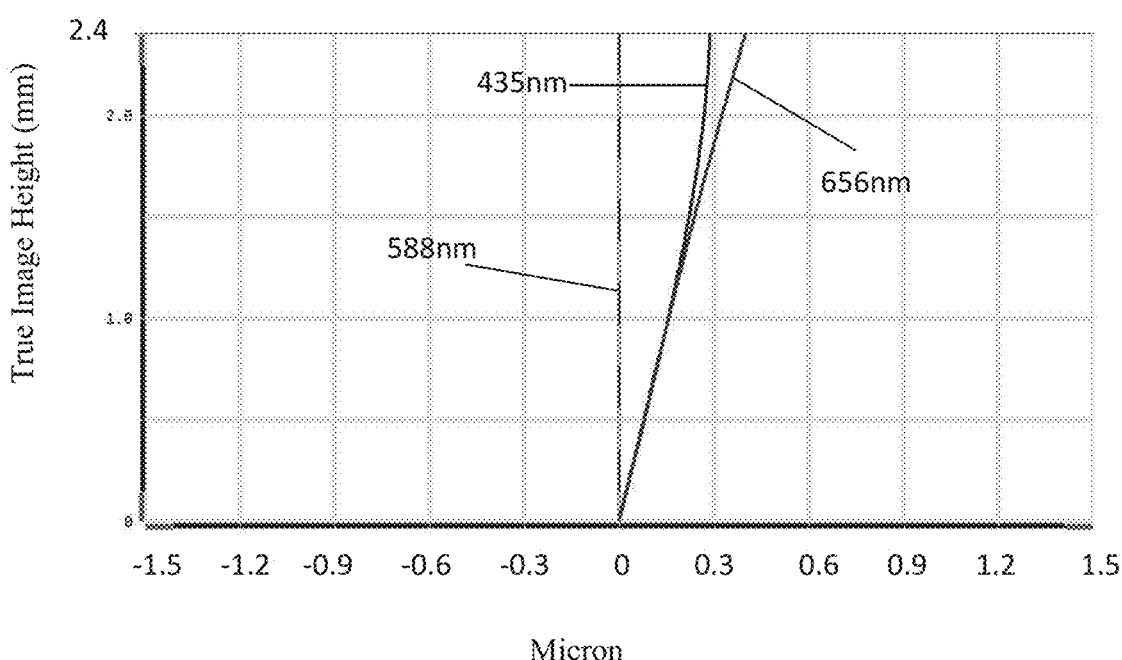
FIG. 7 is a schematic diagram showing the magnification chromatic aberration of the microscope objective lens shown in FIG. 5.
Figure 8:
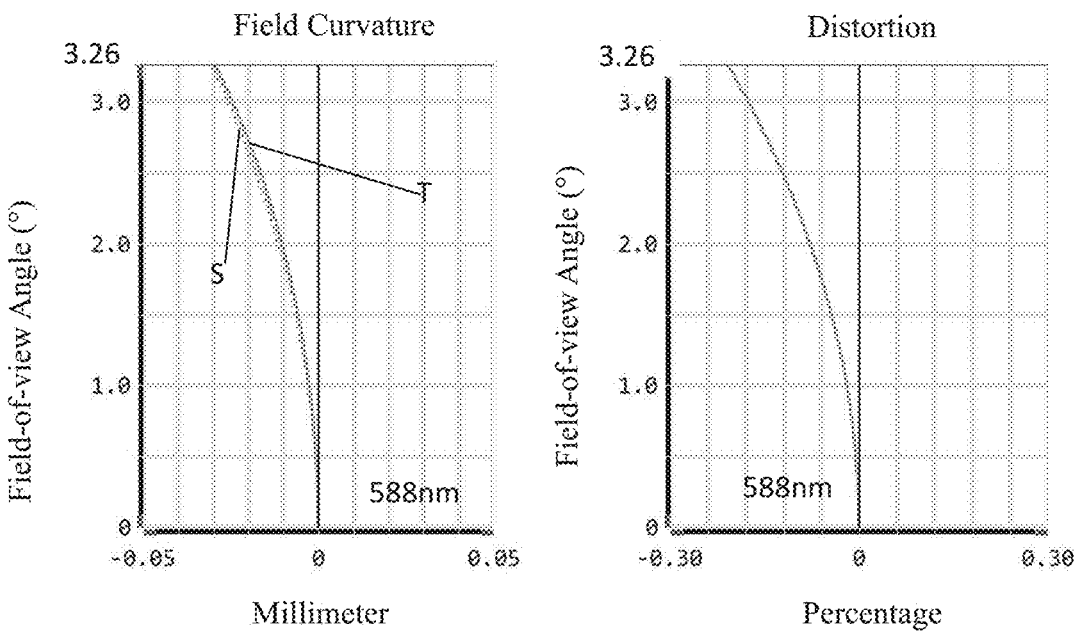
FIG. 8 is a schematic diagram showing the field curvature and distortion of the microscope objective lens shown in FIG. 5.

FIGS. 6 and 7 are schematic diagrams illustrating the magnification chromatic aberration and axial aberration of light with wavelengths of 435 nm, 588 nm, and 656 nm, respectively, after passing through the microscope objective lens 20 of the second embodiment. FIG. 8 shows a schematic diagram of the field curvature and distortion of the light with a wavelength of 588 nm after passing through the microscope objective lens 20 of the second embodiment. The field curvature S of FIG. 8 is the field curvature in the arc-sagittal direction, and the field curvature T is the field curvature in the meridional direction.

As shown in Table 4, the second embodiment satisfies each of the relationship expressions.

In this embodiment, the microscope objective lens described has an Entrance Pupil Diameter (ENPD) of 10.700 mm, a full field-of-view image height of 2.400 mm, a field-of-view angle of 6.52° in the diagonal direction, a numerical aperture NA of 0.13 mm, a long working distance, and has excellent optical characteristics due to its on-axis and off-axis chromatic aberrations being sufficiently compensated.

Third Embodiment

Figure 9:
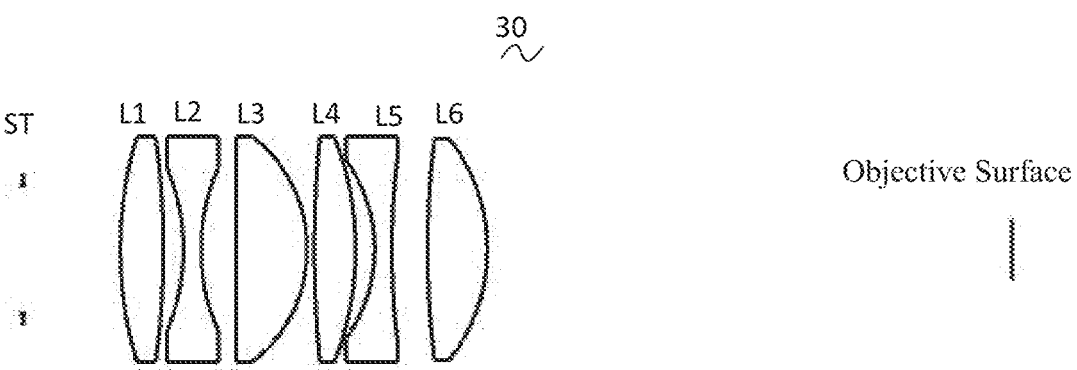
FIG. 9 is a structural diagram of the microscope objective lens according to the third embodiment of the present application.

The third embodiment is essentially the same as the first embodiment, and the meaning of the symbols is the same as that of the first embodiment. In the third embodiment, the emitting surface of the third lens L3 is concave at the proximal-axis position. The structural form of the microscope objective lens 30 of this third embodiment is shown in FIG. 9, and only the differences are listed below.

Table 3 shows the design data of the microscope objective lens 30 according to the third embodiment of the present application.

TABLE 3

| | | Design data of microscope objective lens 30 | | | | | |
|---|---|---|---|---|---|---|---|
| | | R | d | | Nd | | Vd |
| ST | | INF | dST | 8.387 | | | |
| L1 | R1 | 28.577 | d1 | 3.709 | n1 | 1.6584 v1 | 50.852 |
| | R2 | −59.781 | d2 | 1.745 | | | |
| L2 | R3 | −14.931 | d3 | 1.498 | n2 | 1.5168 v2 | 64.199 |
| | R4 | 14.904 | d4 | 3.036 | | | |
| L3 | R5 | −1355.818 | d5 | 6.079 | n3 | 1.4970 v3 | 81.605 |
| | R6 | −10.859 | d6 | 0.647 | | | |
| L4 | R7 | 85.315 | d7 | 3.530 | n4 | 1.4970 v4 | 81.605 |
| | R8 | −22.999 | d8 | 1.655 | | | |
| L5 | R9 | −11.352 | d9 | 1.499 | n5 | 1.7433 v5 | 49.222 |
| | R10 | 57.167 | d10 | 3.054 | | | |
| L6 | R11 | 66.871 | d11 | 5.137 | n6 | 1.4970 v6 | 81.605 |
| | R12 | −13.380 | d12 | 45.207 | | | |

Figure 10:
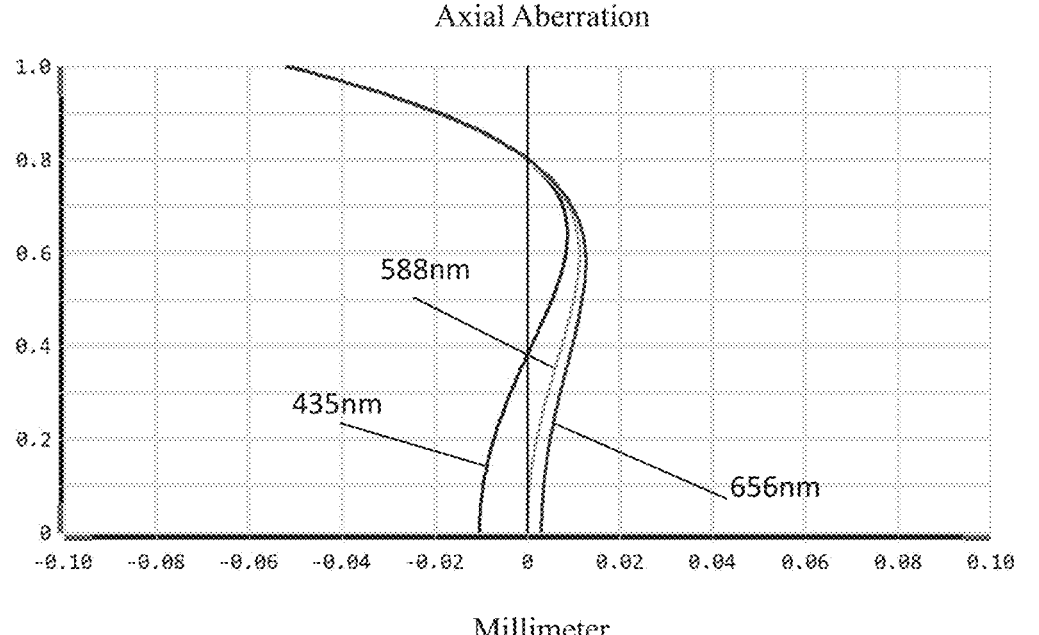
FIG. 10 is a schematic diagram showing the axial aberration of the microscope objective lens shown in FIG. 9.
Figure 11:
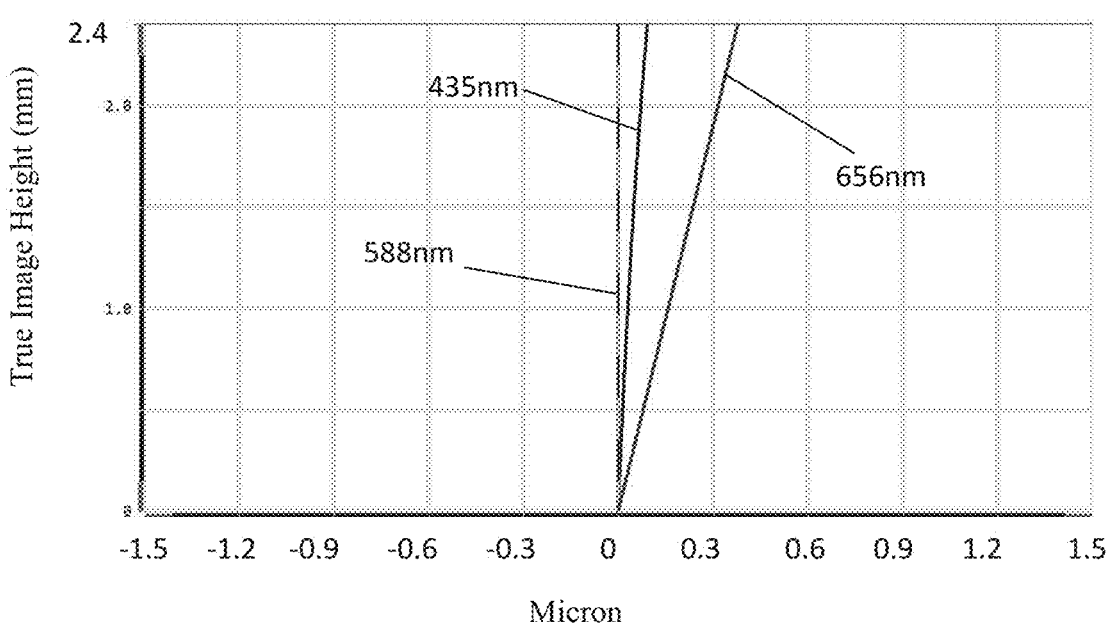
FIG. 11 is a schematic diagram showing the magnification chromatic aberration of the microscope objective lens shown in FIG. 9.
Figure 12:
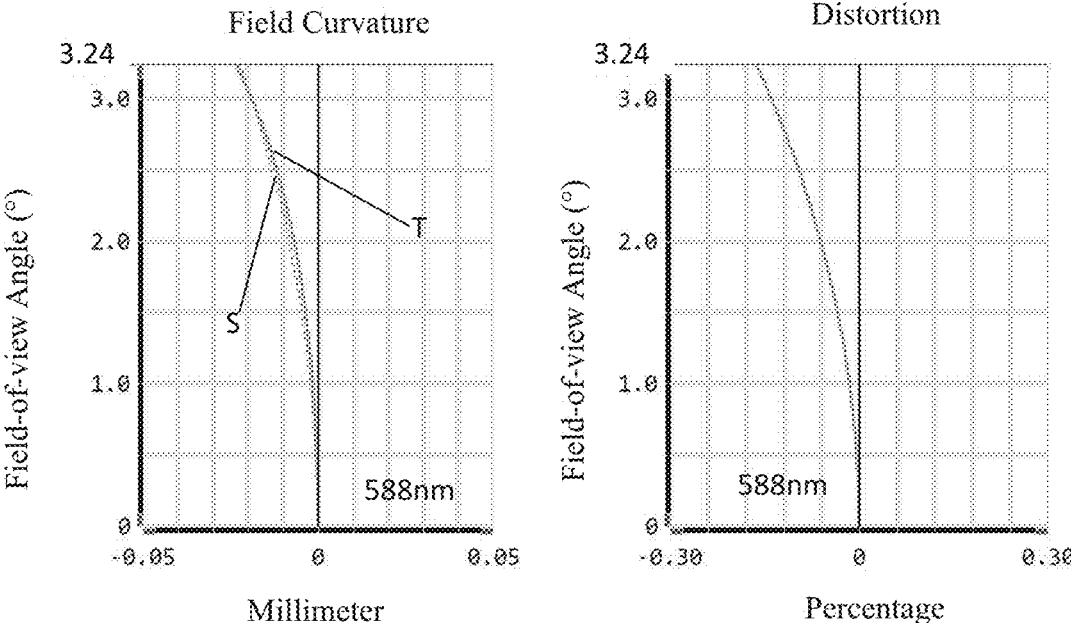
FIG. 12 is a schematic diagram showing the field curvature and distortion of the microscope objective lens shown in FIG. 9.

FIGS. 10 and 11 are schematic diagrams illustrating the magnification chromatic aberration and axial aberration of light with wavelengths of 435 nm, 588 nm, and 656 nm, respectively, after passing through the microscope objective lens 30 of the third embodiment. FIG. 12 shows a schematic diagram of the field curvature and distortion of the light with a wavelength of 588 nm after passing through the microscope objective lens 30 of the third embodiment. The field curvature S of FIG. 12 is the field curvature in the arc-sagittal direction, and the field curvature T is the field curvature in the meridional direction.

As shown in Table 4, the third embodiment satisfies each of the relationship expressions.

In this embodiment, the microscope objective lens described has an Entrance Pupil Diameter (ENPD) of 10.240 mm, a full field-of-view image height of 2.400 mm, a field-of-view angle of 6.48° in the diagonal direction, a numerical aperture NA of 0.120 mm, a long working distance, and has excellent optical characteristics due to its on-axis and off-axis chromatic aberrations being sufficiently compensated.

TABLE 4

| Values corresponding to various numerical values in each embodiment and the parameters specified in each relationship expression | | | |
|---|---|---|---|
| Parameters and relationship expressions | First Embodiment | Second Embodiment | Third Embodiment |
| R11/R12 | −2.523 | −1.509 | −4.998 |
| WD/TTL | 0.494 | 0.403 | 0.589 |
| R1/((n1 − 1)*f) | 1.966 | 3.995 | 1.021 |
| d5/d4 | 2.918 | 5.998 | 2.002 |
| f | 40.014 | 42.248 | 42.501 |
| f1 | 28.940 | 30.269 | 29.862 |
| f2 | −14.457 | −15.936 | −14.190 |
| f3 | 25.184 | 25.251 | 21.992 |
| f4 | 30.454 | 30.575 | 36.849 |
| f5 | −10.030 | −9.041 | −12.624 |
| f6 | 19.857 | 19.727 | 22.919 |
| TTL | 87.040 | 90.463 | 76.797 |
| IH | 2.400 | 2.400 | 2.400 |
| FOV | 6.88° | 6.52° | 6.48° |
| NA | 0.14 | 0.13 | 0.12 |
| Magnification | 5.0 | 4.7 | 4.7 |

It can be understood by those of ordinary skill in the art that each of the above embodiments is a specific embodiment for realizing the present application, and that various changes can be made thereto in form and detail in practical application without departing from the spirit and scope of the present application.

What is claimed is:

1. A microscope objective lens, comprising in order from an emitting side to an objective side:

a first lens having a positive refractive force;

a second lens having a negative refractive force;

a third lens having a positive refractive force;

a fourth lens having a positive refractive force;

a fifth lens having a negative refractive force; and a sixth lens having a positive refractive force;

wherein a central radius of curvature of an emitting surface of the sixth lens is R11; a central radius of curvature of an objective surface of the sixth lens is R12; an on-axis distance from an objective surface of the microscope objective lens to the objective surface of the sixth lens is WD; an on-axis distance from the objective surface of the microscope objective lens to an emitting surface of the first lens is TTL; a central radius of curvature of the emitting surface of the first lens is R1; a refractive index of the first lens is n1; a focal length of the microscope objective lens is f; an on-axis thickness of the third lens is d5; an on-axis distance from the second lens to the third lens is d4, and the following relationship expressions are satisfied:

$$-5.00 \le R11/R12 \le -1.50;$$

$$0.40 \le WD/TTL \le 0.60;$$

$$1.00 \le R1/((n1-1)*f) \le 4.00;$$

$$2.00 \le d5/d4 \le 6.00.$$

2. The microscope objective lens of claim 1, wherein a focal length of the fifth lens is f5, and the following relationship expression is satisfied:

$$-0.30 \le f5/f \le -0.20.$$

3. The microscope objective lens of claim 1, wherein a central radius of curvature of an emitting surface of the fourth lens is R7, and the following relationship expression is satisfied:

$$0.70 \le R7/f \le 2.10.$$

4. The microscope objective lens of claim 1, wherein the emitting surface of the first lens is convex at a proximal-axis position, and the objective surface of the first lens is convex at the proximal-axis position;

the central radius of curvature of the emitting surface of the first lens is R1; a central radius of curvature of the objective surface of the first lens is R2; an on-axis thickness of the first lens is d1, and a focal length of the first lens is f1, and the following relationship expressions are satisfied:

$$0.35 \le f1/f \le 1.08;$$

$$-0.71 \le (R1+R2)/(R1-R2) \le 0.97;$$

$$0.02 \le d1/TTL \le 0.11.$$

5. The microscope objective lens of claim 1, wherein an emitting surface of the second lens is concave at a proximal-axis position, and an objective surface of the second lens is concave at the proximal-axis position;

a central radius of curvature of the emitting surface of the second lens is R3; a central radius of curvature of the objective surface of the second lens is R4; a focal length of the second lens is f2; an on-axis thickness of the second lens is d3, and the following relationship expressions are satisfied:

$$-0.75 \le f2/f \le -0.22;$$

$$-0.56 \le (R3+R4)/(R3-R4) \le 0;$$

$$0.01 \le d3/TTL \le 0.07.$$

6. The microscope objective lens of claim 1, wherein an objective side of the third lens is convex at a proximal-axis position;

a central radius of curvature of an emitting surface of the third lens is R5; a central radius of curvature of the objective surface of the third lens is R6; a focal length of the third lens is f3, and the following relationship expressions are satisfied:

$$0.26 \le f3/f \le 0.94;$$

$$0.43 \le (R5+R6)/(R5-R6) \le 1.52;$$

$$0.04 \le d5/TTL \le 0.17.$$

7. The microscope objective lens of claim 1, wherein an emitting surface of the fourth lens is convex at a proximal-axis position, and an objective surface of the fourth lens is convex at the proximal-axis position;

a focal length of the fourth lens is f4; a central radius of curvature of the emitting surface of the fourth lens is R7; a central radius of curvature of the objective surface of the fourth lens is R8; an on-axis thickness of the fourth lens is d7, and the following relationship expressions are satisfied:

$$0.36 \le f4/f \le 1.30;$$

$$0 \le (R7+R8)/(R7-R8) \le 0.86;$$

$$0.02 \le d7/TTL \le 0.12.$$

8. The microscope objective lens of claim 1, wherein an emitting surface of the fifth lens is concave at a proximal-axis position, and an objective surface of the fifth lens is concave at the proximal-axis position;

a central radius of curvature of the emitting surface of the fifth lens is R9; a central radius of curvature of the objective surface of the fifth lens is R10; an on-axis thickness of the fifth lens is d9, and the following relationship expressions are satisfied:

$$-1.34 \le (R9+R10)/(R9-R10) \le 0.03;$$

$$0.01 \le d9/TTL \le 0.15.$$

9. The microscope objective lens of claim 1, wherein the emitting surface of the sixth lens is convex at a proximal-axis position, and the objective surface of the sixth lens is convex at the proximal-axis position;

a focal length of the sixth lens is f6; an on-axis thickness of the sixth lens is d11, and the following relationship expressions are satisfied:

$$0.23 \le f6/f \le 0.81;$$

$$0.03 \le d11/TTL \le 0.18.$$

10. The microscope objective lens of claim 1, wherein the first lens, the second lens, the third lens, the fourth lens, the fifth lens, and the sixth lens are all made of glass.

\* \* \* \* \*